United States Patent [19]

Bray et al.

[11] 4,367,861
[45] Jan. 11, 1983

[54] INSTALLATION CONTROL VALVES

[75] Inventors: Geddes A. Bray, Moston; Richard J. Holker, Marple, both of England

[73] Assignee: Mather & Platt Limited, Manchester, England

[21] Appl. No.: 186,044

[22] Filed: Sep. 11, 1980

Related U.S. Application Data

[63] Continuation of Ser. No. 916,692, Jun. 19, 1978, abandoned.

[30] Foreign Application Priority Data

Jul. 14, 1978 [GB] United Kingdom ............... 29595/77

[51] Int. Cl.³ .......................................... F16K 31/126
[52] U.S. Cl. ........................................ 251/61; 169/20; 251/305; 251/308; 251/335 A
[58] Field of Search ...................... 169/16, 17, 20, 21, 169/22, 23; 251/58, 61.4, 127, 305, 306, 308, 335 A; 137/628, 625.31, 875, 876, 599; 98/121 A

[56] References Cited

U.S. PATENT DOCUMENTS

| | | | |
|---|---|---|---|
| 1,815,355 | 7/1931 | Hamilton | 169/21 |
| 1,947,309 | 2/1934 | Crowley | 169/20 |
| 1,976,022 | 10/1934 | Hutchinson | 169/20 |
| 2,882,010 | 4/1959 | Bryant | 251/306 |
| 3,262,671 | 7/1966 | Muench | 251/308 |
| 3,307,633 | 3/1967 | Newall | 169/22 |
| 3,771,759 | 11/1973 | Pauquette | 251/58 |
| 3,960,177 | 6/1976 | Baumann | 251/305 |
| 3,971,414 | 7/1976 | Illing | 251/305 |
| 4,295,632 | 10/1981 | Engelke | 251/305 |

*Primary Examiner*—George L. Walton
*Attorney, Agent, or Firm*—Sughrue, Mion, Zinn, Macpeak & Seas

[57] ABSTRACT

An installation control valve, for example for use in a fire fighting sprinkler installation, comprises a pivotal butterfly valve disc co-operable with a movable stop, which in one position abuts the valve disc to retain the valve closed against pressure forces acting thereon. A retaining mechanism is releasably held to resist stop movement and so prevent valve disc opening but is operable under a predetermined condition to permit stop movement from said one position to a second position. When the stop is in the second position, unequal pressure forces on either side of the valve disc cause same to move thereby opening the valve.

18 Claims, 5 Drawing Figures

INSTALLATION CONTROL VALVES

This application is a continuation of our U.S. Application Ser. No. 916,692 filed June 19, 1978, now abandoned, and relates to valves which normally prevent fluid flow through a pipework system but which, under a predetermined condition, open to permit said fluid flow (hereinafter and in the claims called "installation control valves").

An example of such a valve is one in a sprinkler or deluge installation which normally prevents water flow through the sprinkler pipework system but which under fire or predetermined conditions opens to allow such flow. Another example is a valve normally preventing egress of inerting or suppressing fluid from a pressure vessel, which valve would be adapted to open under a predetermined condition to allow such egress.

Known installation control valves comprise hinged clack valves wherein the valve member is hinged at one side to the valve body and is retained in a closed position by a locking lever arrangement. To open the valve, the lever arrangement is released so that fluid pressure can swing the valve member or clack open out of the flow of the fluid. However, these known arrangements have several major disadvantages caused mainly by the fact that the valve member or clack is hinged at one side. As a result of this, the load which the lever arrangement must bear to keep the valve closed is usually considerable and results in large cumbersome arrangements of sufficient strength to bear the loading but causing increased weight which the force exerted by the fluid must overcome to open the valve. The out of balance forces resulting from the side hinged arrangement and the weight of the clack and associated lever arrangement results in a severe impact blow of the clack on the valve body when the valve operates under high fluid pressure. This problem is usually solved by providing a heavy body for the valve which must additionally be of a sufficient size to accommodate the clack in the open position, that is, be of a considerably larger diameter than that of the pipework and the clack. A further disadvantage is the fact that the valve does not automatically close on cessation of the fluid flow through the valve as the clack is unable to fall back into its closed position.

The object of the present invention is to provide an installation control valve which overcome the aforesaid disadvantages but which is adapted to open quickly under a predetermined condition.

According to the present invention there is provided an installation control valve comprising:

(a) a valve body for disposition in fire extinguishing installation pipework downstream of a pressurised source of extinguishant;

(b) a butterfly valve disc within said valve body and normally retained closed to prevent the flow of extinguishant through the installation pipework, said valve disc being rotatably mounted within said valve body about an axis that is off-set longitudinally of the point of intersection of a plane in which the periphery of said valve disc lies and a longitudinal axis of said disc normal to said plane;

(c) a movable stop cooperable with said butterfly valve disc and which in one position abuts said valve disc to retain said valve closed against pressure forces acting thereon and which in a second position frees said valve disc for pivotal movement; and (d) a retaining mechanism which is releasably held to resist stop movement and prevent said valve disc from opening, and which is operable under a predetermined condition to permit stop movement from said one position to said second position whereby unequal pressure forces on either side of the said off-set axis on one side of the valve disc can cause valve opening.

The present invention overcomes the disadvantages of the prior art valves by the employment of a butterfly valve disc instead of a clack. These butterfly discs have never been used hitherto in installation control valves and they have the advantage that they are suitable for use with both wet and dry installations and open quickly at low fluid pressures as only small out of balance loads are required to swivel the disc open. In addition, correspondingly smaller forces are required to maintain the valve closed. Additionally, the valve body can be reduced in size and strength as there is never any impact between the valve disc and the body.

One advantage of the prior art valve was that the clack swung out of the path of fluid passing through the valve so that it did not create turbulence although this advantage was mitigated by the increased size of the body which caused the flow to lose pressure so that turbulence was created. It is important to keep turbulence to a minimum to ensure a minimum loss of fluid pressure flow of fluid and to reduce cavitation erosion on the valve components and the pipework. The valve of the present invention owing to the fact that it incorporates a butterfly valve, which is of its nature an aerodynamic shape, creates little turbulence at high pressure flows and can be modified by slight alteration of its shape to create little turbulence at low pressure flows. As the valve body does not affect the flow in the present invention these good effects are not thereby mitigated as in the prior art.

Embodiments of the present invention will now be described, by way of example, with reference to the accompanying drawings in which.

Figure 1:
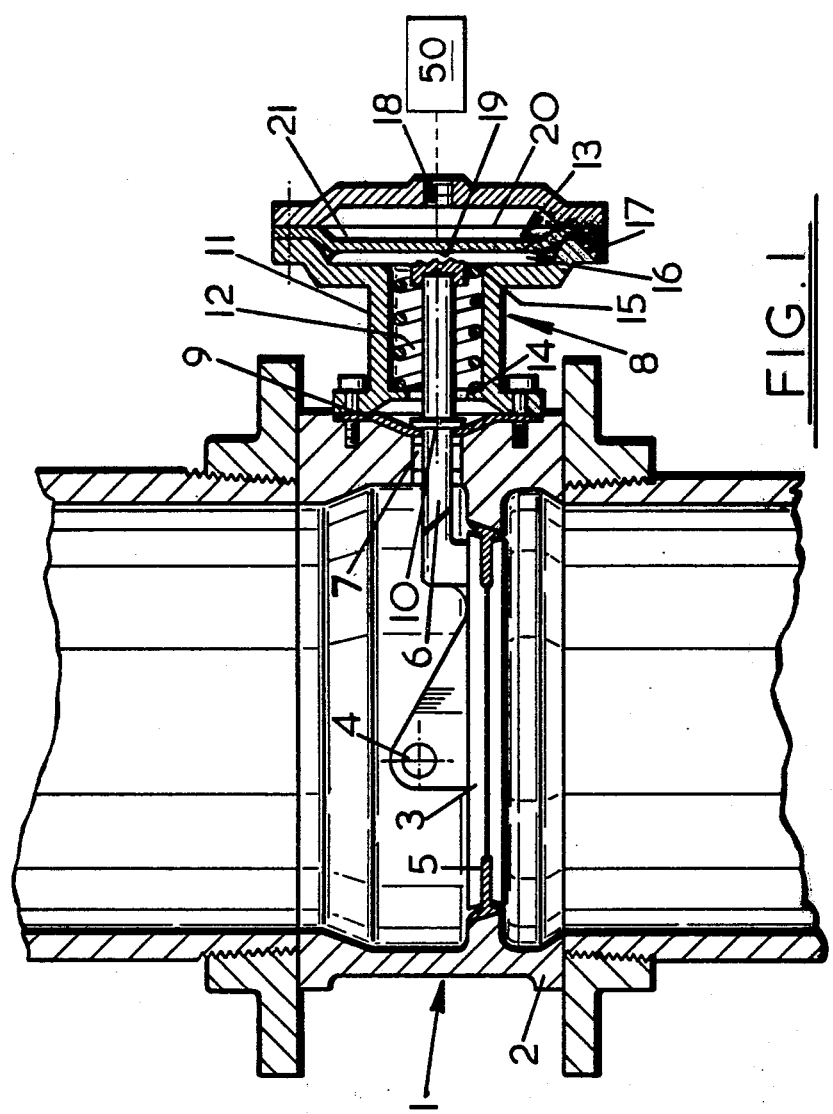
FIG. 1 is a cross section through a valve according to the present invention in a closed condition.

Referring firstly to FIG. 1, the valve 1 shown therein is a butterfly valve comprising a housing 2 in which is mounted a valve disc 3 of aerodynamic shape. The valve disc 3 is attached to a pivot spindle 4 which is off-centre relative to the longitudinal valve axis and lies outside of the plane in which the periphery of the disc lies. The spindle 4 is pivotally attached to the interior of the housing 2, for example the ends of the spindle 4 can be located in two opposed bearings in the interior of the housing 2. A sealing ring 5 is arranged around the periphery of the valve disc 3 to maintain a fluid-tight seal therearound when the valve is closed. Preferably, the sealing ring 5 is effective with pressure on both sides of the valve disc and is so formed to retain pressure particularly upstream of the valve disc 3 which is usually higher than the pressure downstream of the valve disc 3. In a modification, the sealing ring is arranged around the interior of the housing 2 and co-operates with the valve disc 3 when the valve is closed.

Arranged to abut one side of the valve disc 3 is a stop in the form of a movable rod 6, which is preferably located, as shown, against the downstream side of the valve disc 3. The rod 6 passes through an aperture 7 in the housing 2 and is retained in a valve disc abutment position by a retaining mechanism 8, as is described below. The aperture 7 is sealed around the rod 6 by a diaphragm 9 which is attached to an annular flange 10 around the rod 6 and has its periphery clamped between the housing 2 and a housing 11 for the retaining mechanism 8. Alternatively, a gland sealing means for the rod 6 could be used.

The housing 11 of the retaining mechanism 8 is attached by bolts to the exterior of the housing 2 and is also intended to be coupled to a source of fluid pressure (not shown) which forms an actuator for the mechanism as will be described. The fluid pressure source could be, for example, the pipework of a sprinkler or deluge installation containing pressurised water or other extinguishant, or, for example, be the pipework of a dry detection system containing pressurised air. In both these examples loss of pressure in the pipework caused by the operation of a sprinkler or detector would also cause valve opening.

The retaining mechanism 8 comprises a compression spring 12 and a diaphragm arrangement 13. One end 14 of the spring abuts the interior of the housing 11, while the other end 15 abuts a plate 16 forming part of the diaphragm arrangement 13 and to which the end of the rod 6 remote from the valve disc 3 is attached. The diaphragm arrangement 13 is located in a portion 17 of the housing 11 of increased diameter which has an aperture 18 through which fluid connection can be made to the pressure source. The plate 15 contacts one side 19 of a flexible diaphragm 20 which is peripherally clamped between two parts of the housing 11 and forms a fluid-tight seal between the rest of the retaining mechanism and the pressure source which acts on the other side 21 of the diaphragm 20.

It is manifest that provided a greater pressure force is maintained via the aperture 18 on the side 21 of the diaphragm 20 than is exerted by the spring 12 and the force transmitted through the rod 6, the diaphragm 20 will remain in the position as shown in the drawing. However, should the pressure on the side 21 of the diaphragm 20 fall below that exerted by the spring, then the diaphragm 20 will move under the action of the spring 12 on the plate 16 to a position within the housing 11 adjacent the aperture 18. Alternatively, pressure applied behind the diaphragm 20, on side 19, would also cause operation of the valve. Such pressure can be applied via a port (not shown) in housing 11.

It will be realised that the angle of abutment of the rod 6 against the valve disc 3 can be varied and the spring strength adjusted accordingly. For larger angles, no spring may be required. In an alternative arrangement, the rod 6 may be zero-angled with a lead for easy engagement of the valve disc.

In use, the valve is normally maintained closed. However, should a predetermined condition arise causing loss of pressure on the side 21 of the diaphragm 20, then when the pressure falls below a predetermined value the spring 12 will cause the diaphragm 20 to move and thus cause the rod 6 to be removed to a position wherein the valve disc is unimpeded. The rod 6 is, in effect, withdrawn from the interior of the housing 2 into the aperture 7. When this occurs, unequal pressure on either side of the spindle 4 on the valve disc 3 will cause the valve to open. Hence, when in use in a sprinkler or deluge installation, the pressure of the extinguishant on the upstream side of the valve disc 3 will open the valve on withdrawal of the rod 6.

The valve can be reset by equalising the pressure over the valve disc 3 which will automatically close under gravity, provided the spindle 4 is not disposed vertically. It is also possible in a modification, to extend one end of the spindle 4 through the housing 2 via a gland sealing arrangement and to provide a key to close the valve disc 3 by location with the extended end of the spindle 4. The retaining mechanism 8 can then be re-pressurised to cause the rod 6 to hold the valve disc 3 in the valve closed position. Alternatively, the valve could be closed by causing fluid back-flow by opening a drain valve upstream of the valve disc 3.

Figure 2:
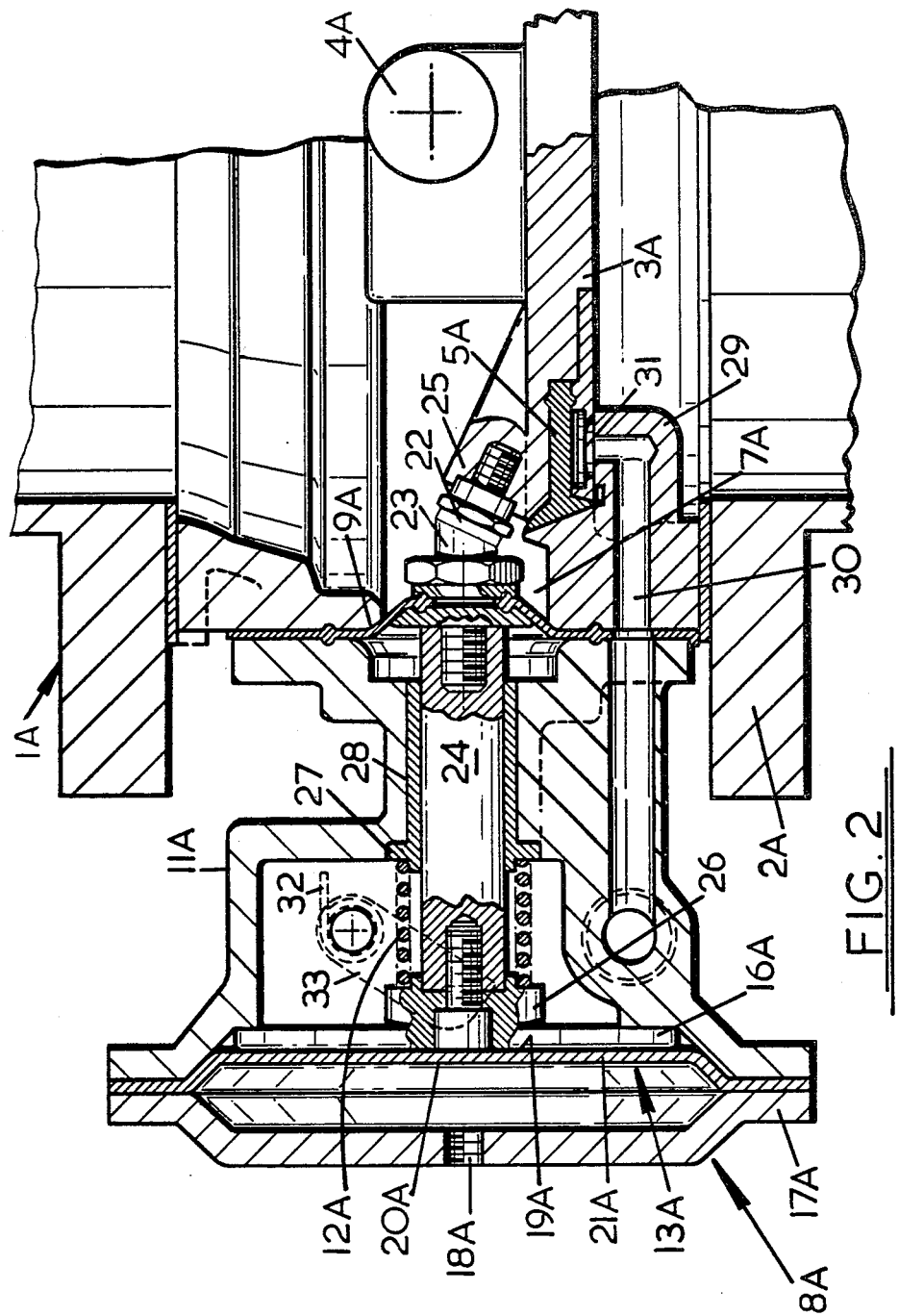
FIG. 2 is a view similar to FIG. 1 of a second embodiment of valve according to the present invention but with a portion of a housing for the valve broken away.

Referring now to the embodiment shown in FIG. 2, it can be seen that in some respects this embodiment is similar to that shown in FIG. 1 and similar parts are numbered with the same numerals as used for FIG. 1 but with the suffix "A".

In this embodiment, the movable stop comprises a pad 22, which may be of non-ferrous material and which is attached to a bolt 23 screwed into one end of a rod 24 forming a part of the retaining mechanism 8A. The pad 22 abuts a projecting portion 25 of the valve disc 3A to maintain the valve in a closed condition.

As previously described, the retaining mechanism 8A is located within a housing 11A attached to the exterior of the valve housing 2. The mechanism 8A comprises a first diaphragm arrangement 13A, which includes a diaphragm 20A and a plate 16A attached to the other end of the rod 24, and is sealed from the interior of the housing 2A by a second diaphragm 9A. However, in this embodiment the diaphragm 9A is attached to the bolt 23 and is located within the interior of the housing 2A. A spring 12A is located between a boss 26 formed on the plate 16A and a flange 27 formed on an insert 28 located in the housing 11A.

The retaining mechanism 8A functions substantially as previously described. Provided that a greater pressure force is maintained on the side 21A of the diaphragm 20A than on the side 19A by the spring 12A and the pressure force exerted by the rod 24, then the pad 22 will be maintained in a position wherein the valve disc 3A is prevented from opening. However, when the pressure on the side 21A is released, then the diaphragm 20A and thereby the rod 24 will move under the force of the spring 12A or under the influence of fluid pressure on the diaphragm 9A and the pad 22 into a position wherein the pad 22 no longer abuts the valve disc 3A. The valve can now open under the influence of unequal pressure on either side of the off-centre spindle 4A on the valve disc or by the effect of a loading means such as a spring, as will be described.

In the embodiment as shown in FIG. 2, there is also included means whereby it can be determined whether the valve is in an open or closed condition. The valve housing 2A is cast with an internal projection 29 which abuts the other side of the valve disc 3A from the pad 22. The projection 29 has a bore 30 therethrough which bore 30 opens at a port 31 at one end and passes through the housing 2A to the exterior of the valve. The port 31 can be obturated when the valve is closed either by the sealing ring 5A carried by the valve disc 3A as shown in FIG. 2 or by a separate sealing gasket attached to a leaf spring attached to the disc 3A. When the valve opens, the port 31 is also opened so that a bleed of pressurised fluid from the interior of the housing 2A can pass to the exterior of same and it can be established that the valve is open. It is envisaged that the bore 30 will be connected to a fluid sensing device, such as a pelton wheel motor, flow or pressure switch and an alarm is thereby triggered on opening of the valve.

Additionally, the projection 29 also forms an immovable stop to prevent the valve disc 3A becoming jammed in a closed position by any pressure downstream should the upstream pressure be reduced or removed.

The embodiment as shown in FIG. 2 and as just described, comprises an "alternate" valve whereby one side of the valve disc 3A can be kept wet or dry as desired but which always gives an alarm when the valve opens.

It will be manifest that the embodiment as shown in FIG. 2 could be employed without the provision of the alarm means in a similar way to the embodiment shown in FIG. 1.

However, when the alarm means is to be used, it is anticipated that initially one side of the valve could be kept dry, for example, by being connected to an initially dry, that is an air filled sprinkler installation, whereas the other side would be maintained wet, for example by being connected to a mains water supply. A loss of pressure causing opening of the valve permits water to flow into the bore 30 to trigger the alarm.

Alternatively, the retaining means 8A could be held out of engagement with the valve disc 3A by an arrangement comprising a lever 32 and a cam 33, as shown in dashed lines in FIG. 2. The valve would then be maintained closed by a balance of pressure on either side of the valve disc 3A. Loss of pressure on one side of the disc 3A, for example as would be caused by the activation of a sprinkler installation connected on one side of the valve, would cause opening of the valve and consequently fluid could pass into the bore 30 to trigger the alarm indicating valve opening.

Where the fluid pressure acting on the side 20A of the diaphragm 19A to maintain the valve disc 3A closed is obtained from the main installation pipework downstream of the valve 1A, it is desirable that the cam 33 be placed in abutment with the plate 16A after valve disc opening to prevent the fluid flow pressure downstream of the valve 1A from causing the movable stop to interfere with subsequent closure of the valve disc 3A or to prevent the valve disc 3A reopening after closure before the valve has been manually reset.

The valve as described according to the second embodiment shown in FIG. 2 can be reset in any of the ways previously described for the first embodiment shown in FIG. 1.

It has been found that the valves as described above with reference to FIGS. 1 and 2 are particularly suited for use in installations in which there is an initially high static fluid pressure. In such high static pressure installations, the Reynolds number of the fluid flow as the valve opens is higher than a critical valve determined for the valve installation with the valve disc closed, the Reynolds number being related directly to the fluid velocity and the dimensions of the valve disc 3, 3A, as a result of the high velocity of the fluid. This causes the fluid flow around the opening valve disc 3, 3A to be turbulent and to swing the valve disc 3, 3A fully open very quickly. Once the disc 3, 3A is fully open, however, fluid flow through the valve occurs with little turbulence owing to the streamlined aerodynamic shape of the fully opened disc 3, 3A. However at lower static fluid pressure and thereby velocities wherein the Reynolds number for the fluid flow is lower than the critical valve boundary layer effects must be taken into account with regard to the fluid flow around the valve disc 3, 3A.

Figures 3, 5:
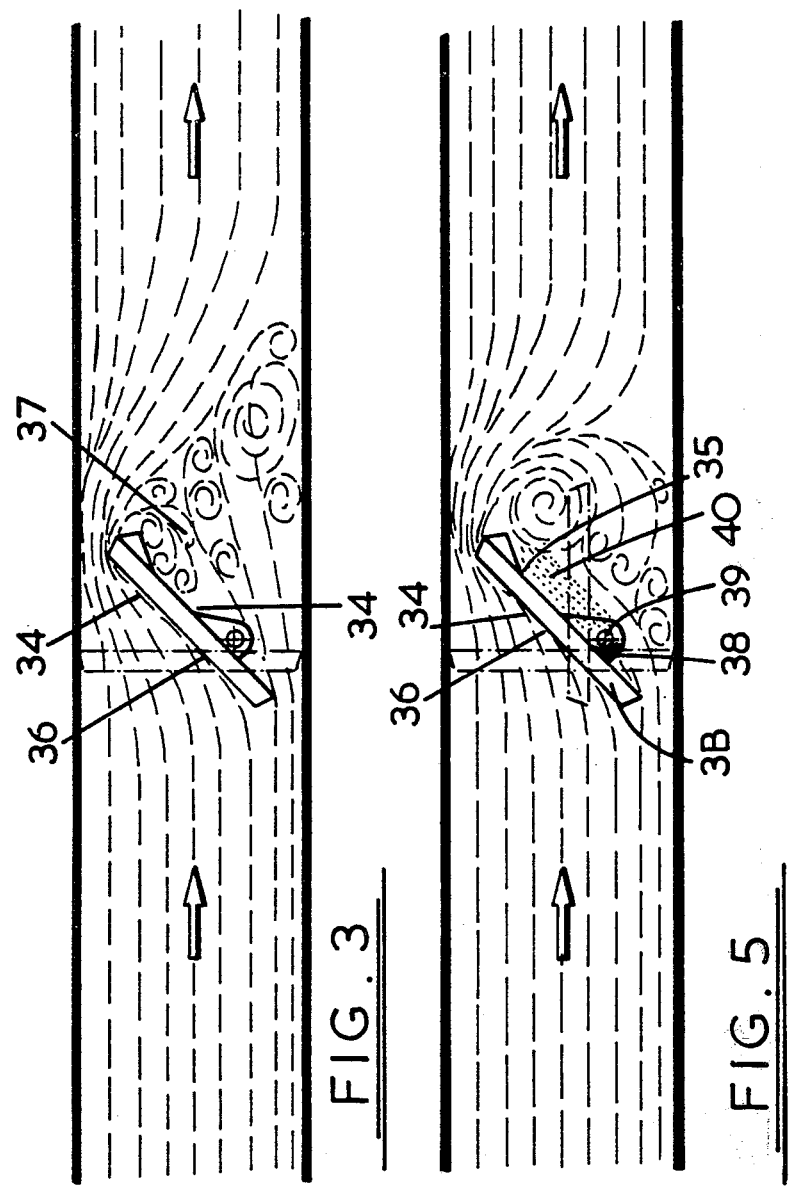
FIG. 3 is a diagram showing a valve similar to those shown in FIGS. 1 and 2 in use in a pipework system.
FIG. 5 is a diagram showing a valve similar to that shown in FIG. 4 in use in a pipework system.

With reference to FIG. 3, when the valve disc 3, 3A is opened by the fluid flow at low static pressures it is, found that the disc 3, 3A does not fully open but remains lodged at its half-open position. This undesirable effect can be explained by a consideration of the boundary layer effects occurring around the disc 3, 3A.

At lower fluid velocities, the fluid flow over the valve disc 3, 3A as it opens, gives rise to a boundary layer 34 adjacent the downstream and upstream faces 35 and 36 respectively of the disc 3,3A. This boundary layer 34 comprises a layer of fluid in which the velocity of the fluid makes the transition between zero at the surface of the valve disc 3, 3A and the free stream velocity of the fluid spaced from the disc 3, 3A. On the upstream face 36 of the valve disc 3, 3A, the boundary layer 34 tends to be laminar, that is regular and steady, and parallel to the surface 36. However, on the downstream face 35 of the disc 3, 3A, the layer 34 tends to be turbulent, that is in which the flow still remains parallel to the surface 35 but tends to be subject to random fluctuation in velocity and magnitude. Hence, the fluid flow adjacent the downstream surface 36 of the valve disc 3, 3A tends to be more turbulent in general as shown at 37 as the valve disc 3, 3A opens.

As is well known in fluid mechanics, the velocity of a fluid is inversely related to its pressure (Bernoulli's theorem). If this is now considered with regard to the foregoing with reference to FIG. 3, it can be seen that adjacent the upstream surface 35 of the valve disc 3, 3A where the boundary layer is laminar, the velocity of the fluid is greater than the fluid velocity adjacent the downstream surface 36 of the disc 3, 3A where the boundary layer is turbulent. This can be understood by appreciating that the half-open valve disc 3, 3A causes the velocity of the fluid to increase in order to travel around the disc 3, 3A which is obstructing the fluid flow. Hence the pressure on the upstream surface 36 of the disc 3, 3A becomes lower than that on the downstream surface 35 during opening of the valve as the valve disc 3, 3A reaches its half-open position. It is found that in this position, the decrease in pressure on the upstream surface 36 of the disc 3, 3A is balanced by the effects of turbulence adjacent the downstream surface 35 so that an equilibrium position for the disc 3, 3A is reached wherein the disc 3, 3A never opens further even if the rate of fluid flow subsequently increases as the Reynolds number has changed owing to the half-open nature of the disc 3, 3A over the initial Reynolds number when the disc 3, 3A was closed.

Figure 4:
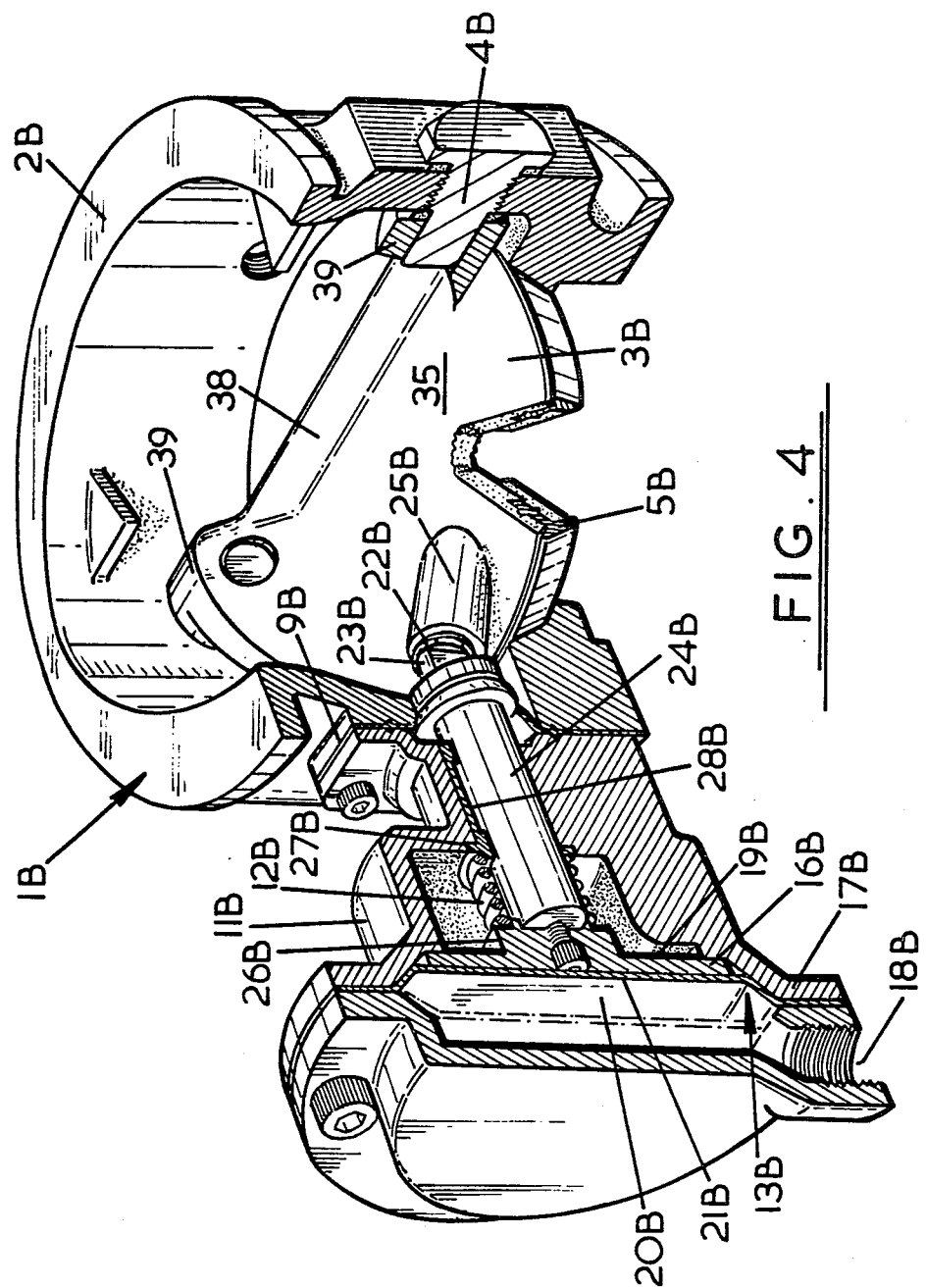
FIG. 4 is a perspective view in section of a modified valve which is otherwise similar to that shown in FIG. 2.

In order to overcome this disadvantage it has been found necessary to alter the aerodynamic shape of the valve disc 3, 3A to disrupt the boundary layer effects which would otherwise occur. Referring now to FIG. 4, there is shown a valve similar to that described with reference to FIG. 2 and similar parts of the valve are indicated by the same numeral as in FIG. 2 but with the suffix "B".

The valve disc 3B is again an off-centre disc pivoted by means of a pair of opposed stub spindles 4B. A sealing ring 5B is provided around the periphery of the disc 3B to be effective with pressure on both sides of the valve disc 3B. Formed across the valve disc 3B on the downstream face 35 thereof is an upraised portion forming a baffle 38. The baffle 38 is formed as a continuation of the bearings 39 in which the spindles 4B locate so that it extends transversely across the face 35 of the disc 3B.

Referring now to FIG. 5, when the valve as shown in FIG. 4 is in use with high velocity fluid flows it operates correctly by opening fully under the pressure of the flow. However, when the valve is in use with a low velocity flow as the valve disc 3B opens, the baffle 38 disrupts the fluid boundary layer which would otherwise form adjacent the downstream surface 35 of the valve disc and creates a low pressure turbulent wave 40 in its place. Hence, in this case, although the pressure of the fluid is low on the upstream surface 36 of the valve disc 3B owing to the laminar boundary layer 34 which forms, the pressure on the downstream surface 36 is even lower as the fluid flow is deflected away from the surface 36. Hence, in this case as the valve disc 3B opens, the pressure on the downstream face 35 of the disc 3B never equals the pressure of the fluid on the upstream face 36 and as a result the disc 3B opens fully, as indicated in dashed lines in FIG. 5.

Whilst the baffle 38 has been found effective to cause a valve disc of the shape shown and described with reference to FIGS. 1, 2 and 3 to open at low pressure fluid flows, other means for affecting the aerodynamic properties of the valve disc can be used depending on the shape and size thereof according to the valve of the Reynolds number.

Apart from the foregoing, we would stress that once the valve disc 3, 3A or 3B is fully open, the turbulence created by the disc is minimal so that the effects of cavitation erosion are kept to a minimum and flow through the valve occurs with little extra turbulence.

However, in a modification of any of the above embodiments, the valve disc 3, 3A, 3B can be loaded by, for example, a spring to a valve open condition. Such a loading would remove the need for the spindle 4 4A, 4B to be located off-centre and the requirement for the baffle 38. The valve disc 3, 3A, 3B could also be spring loaded to a valve closed position.

In a further modification, a releasable catch can be provided pivotally mounted within the housing 2, 2A, 2B at one side of the valve disc 3, 3A, 3B and arranged so that, on valve disc movement to an open condition, the catch pivots into a position preventing valve closure.

The diaphragm arrangement 13, 13A, 13B may also be linked to an air pressure loss detector device (an accelerator) which serves to open a passage when the air pressure drop is large, as when a sprinkler operates, to equalise air pressure on both sides of the diaphragm 20, 20A, 20B or leak it to atmosphere as required to speed up opening of the valve.

It will be realised, however, that many different types of retaining mechanism could be employed instead of the example described. Mechanical or electrical actuators could also be used. For example, the rod 6 or 24, 24B could be controlled by a solenoid or an electric motor 50, or, alternatively, movement of the rod under gravity could be caused to occur by the removal of an impediment therefrom.

It is anticipated that a pair of butterfly valves as described could be located within a single length of pipeline to form an air or waterlock between the valves, a drain to atmosphere being provided from the lock. The two valve discs would be coupled by a crank and connecting rod arrangement which could be located within the lock itself or externally. A stop and retaining mechanism as already described may act on one of the valve discs, or back-pressure downstream may retain the valve closed.

This particular arrangement functions as linked back-pressure valves with a drained length of pipe therebetween. For example, a town water supply on the upstream side of the valve would be completely isolated from possibly contaminated water downstream of the valves and any leakage from the downstream valve would drain away via the drain.

These valves may be manually re-set as previously described, be spring biassed to close or alternatively a flow switch could be provided to cause slow closure of the valves when cessation of the fluid flow through the pipeline is required.

It will be appreciated from the foregoing that the valve of the present invention provides a most versatile valve for installations such as fire fighting deluge and sprinkler installations and has many advantages over the prior art. One of the most important advantages is the capacity of the valve to open with low out of balance forces, which arises directly as the result of it incorporating a butterfly valve which has never been known heretofore. This enables the valve to open with little impact on the valve body unlike the valves of the prior art in which the fluid pressure forcibly swings back the heavy hinged clack and locking lever arrangements associated therewith to impact the valve body wall. Additionally, as the valve disc is a butterfly valve the retaining mechanism does not need the strength required for that of a clack and can be made lighter.

It can be seen also that after operation of the valve and before the valve is reset, the valve will operate as a back pressure valve, which is an advantage that does not occur with the valves of the prior art.

In the prior art, the installation control valve is located downstream of a non-return valve which prevents fluid from flowing back out of the installation after having once entered. For example, this prevents water from a town mains supply from entering the installation and then returning back to the mains, which would otherwise contaminate the mains water. With the prior art installation control valves, when the fluid flow is arrested air can be trapped in the installation pipework between the control valve and the non-return valve and cause severe water hammer in the installation pipework. However, with the installation control valve of the present invention, closure of the valve is rapid when the fluid flow rate falls so that water hammer is prevented.

What is claimed is:

1. An installation control valve comprising:
   (a) a valve body for disposition in fire extinguishing installation pipework downstream of a pressurized source of extinguishant;
   (b) a butterfly valve disc within said valve body and normally retained closed to prevent the flow of extinguishant through the installation pipework, said valve disc being fixedly rotatably mounted within said valve body about an axis of rotation, that is off-set longitudinally of the point of intersection of a plane in which the periphery of said valve disc lies and a longitudinal axis of said disc normal to said plane by a distance sufficiently great that said valve disc will open with a slight pressure differential thereon and will close upon cessation of fluid flow, and said axis of rotation being parallel to said plane in all positions of said valve disc;

(c) a movable stop cooperable with said butterfly valve disc and which in one position abuts said valve disc to retain said valve closed against pressure forces acting thereon and which in a second position frees said valve disc for pivotal movement; and (d) a retaining mechanism which is releasably held to resist stop movement and prevent said valve disc from opening, and which is operable under a predetermined condition to permit stop movement from said one position to said second position whereby unequal pressure forces on either side of the said off-set axis on one side of the valve disc can cause valve opening.

2. A valve as claimed in claim 1, in which said valve disc is rotatably mounted about an axis which is off-set both longitudinally and transversely of the point of intersection of said plane in which the periphery of the valve disc lies and said longitudinal axis of said disc.

3. A valve as claimed in claim 1, in which the valve disc is aerodynamically shaped.

4. A valve as claimed in claim 1, in which the valve disc is provided with means enabling the disc to open fully by creating a low pressure zone adjacent the downstream face of the disc.

5. A valve as claimed in claim 4, in which said means comprise baffle means.

6. A valve as claimed in claim 1, in which the valve disc cooperates with a sealing ring which is effective with pressure on both sides of the valve disc.

7. A valve as claimed in claim 1, in which the stop comprises a movable rod which passes to the exterior of a housing for the valve and is held in a valve disc abutment position by the retaining mechanism.

8. A valve as claimed in claim 7, in which the rod passes through an aperture defined by the housing, which aperture is sealed around the rod by a diaphragm peripherally clamped between the valve housing and a housing for the retaining mechanism.

9. A valve as claimed in claim 1, in which the retaining mechanism comprises a diaphragm arrangement which is adapted to be connected to a source of pressurised fluid.

10. A valve as claimed in claim 9, in which the stop comprises a movable rod which passes to the exterior of the housing for the valve and is connected to a diaphragm of the diaphragm arrangement and is resiliently biased by biasing means into said second position, which biasing means act, in use, against the pressure force of the fluid acting on the diaphragm.

11. A valve as claimed in claim 9, in which the movable stop may be held in said second position by a lever and cam mechanism acting on the diaphragm arrangement.

12. A valve as claimed in claim 1, in which a fluid discharge port is arranged in proximity to the valve disc whereby when the valve is closed the port is obturated and when the valve is open the port is open to permit a bleed of fluid to flow therethrough.

13. A valve as claimed in claim 12, in which the fluid discharge port is located in a projection which abuts the valve disc when it is in a closed position so obturating the discharge port and which additionally forms an immovable stop for the valve disc to prevent jamming of same.

14. A valve as claimed in claim 1, in which the retaining mechanism comprises an actuator such as a solenoid.

15. An installation control valve comprising:
(a) a valve body for disposition in fire extinguishing installation pipework downstream of a pressurized source of extinguishant;
(b) a butterfly valve disc within said valve body and normally retained closed to prevent the flow of extinguishant through the installation pipework, said valve disc being fixedly rotatably mounted within said valve body about an axis of rotation that is off-set longitudinally of the point of intersection of a plane in which the periphery of said valve disc lies and a longitudinal axis of said disc normal to said plane, and said axis of rotation being parallel to said plane in all positions of said valve disc;
(c) a baffle extending across said valve disc on the downstream side thereof, said baffle having dimensions such that said valve disc opens fully under the pressure of fluid flow and remains open at low flow velocities;
(d) a movable stop cooperable with said butterfly valve disc and which in one position abuts said valve disc to retain said valve closed against pressure forces acting thereon and which in a second position frees said valve disc for pivotal movement; and
(e) a retaining mechanism which is releasably held to resist stop movement and prevent said valve disc from opening, and which is operable under a predetermined condition to permit stop movement from said one position to said second position whereby unequal pressure forces on either side of the said off-set axis on one side of the valve disc can cause valve opening.

16. A valve as claimed in claim 15, in which said valve disc comprises bearing portions adapted for receiving spindles extending from said valve body wherein said valve disc in rotable about said axis upon said spindles, and in which said baffle comprises an upraised portion of said valve disc extending between said bearing portions and formed as a continuation of said bearing portions.

17. An installation control valve comprising:
(a) a valve body for disposition in fire extinguishing installation pipework downstream of a pressurized source of extinguishant;
(b) a butterfly valve disc within said valve body and normally retained closed to prevent the flow of extinguishant through the installation pipework, said valve disc being rotatably mounted within said valve body about an axis that is off-set longitudinally of the point of intersection of a plane in which the periphery of said valve disc lies and a longitudinal axis of said disc normal to said plane;
(c) a movable stop cooperable with said butterfly valve disc and which in one position abuts said valve disc to retain said valve closed against pressure forces acting thereon and which in a second position frees said valves disc for pivotal movement;
(d) a retaining mechanism which is releasably held to resist stop movement and prevent said valve disc from opening, and which is operable under a predetermined condition to permit stop movement from said one position to said second position whereby unequal pressure forces on either side of the said off-set axis on one side of the valve disc can cause valve opening; and (e) a projection extending inwardly from said valve body at a position so as to abut said valve disc opposite said movable stop to prevent said valve disc from jamming closed, a passage being formed through said projection and said valve body wherein said passage is closed in a closed position of said valve disc and communicated with the interior of said valve body in an open position of said valve disc to thereby provide to a point exterior to said valve body an indication of whether said valve is open or closed.

18. A valve as claimed in claim 17, in which said valve disc is provided with a sealing ring which closes said passage in said closed position of said valve.

* * * * *